(12) United States Patent
Kimura (10) Patent No.: US 10,540,558 B2
(45) Date of Patent: Jan. 21, 2020

(54) INFORMATION PROCESSING APPARATUS AND NON-TRANSITORY COMPUTER READABLE MEDIUM FOR DETERMINING ACCURACY OF ANALYZED INPUT DATA

(71) Applicant: FUJI XEROX CO., LTD., Tokyo (JP)

(72) Inventor: Shunichi Kimura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/108,363

(22) Filed: Aug. 22, 2018

(65) Prior Publication Data

US 2019/0294904 A1    Sep. 26, 2019

(30) Foreign Application Priority Data

Mar. 20, 2018  (JP) ................................. 2018-052197

(51) Int. Cl.
   *G06K 9/03*   (2006.01)
   *G06K 9/00*   (2006.01)

(52) U.S. Cl.
   CPC ........... *G06K 9/03* (2013.01); *G06K 9/00449* (2013.01); *G06K 9/00456* (2013.01); *G06K 2209/01* (2013.01)

(58) Field of Classification Search
   CPC ....................................................... G06K 9/03
   USPC ....................................................... 358/1.15
   See application file for complete search history.

(56) References Cited

U.S. PATENT DOCUMENTS

| 5,455,872 A * | 10/1995 | Bradley ............... G06K 9/6292 382/228 |
| 7,240,062 B2 * | 7/2007 | Andersen ............. G06K 9/6292 |
| 9,043,349 B1 * | 5/2015 | Lin .......................... G06K 9/18 707/758 |

FOREIGN PATENT DOCUMENTS

| JP | H05-274467 A | 10/1993 |
| JP | 2003-346080 A | 12/2003 |
| JP | 2004-171326 A | 6/2004 |
| JP | 2010-073201 A | 4/2010 |

* cited by examiner

*Primary Examiner* — Jacky X Zheng
(74) *Attorney, Agent, or Firm* — Oliff PLC (57) ABSTRACT

An information processing apparatus includes: determination units that make determinations on an input using different methods, and obtain determination results for the input; a first output unit that outputs, when a certain percentage or more of the determination results match, a determination result matched at the certain percentage or more; a second output unit that outputs, when the first output unit does not find a determination result matched at the certain percentage or more, a final determination result for the input; and an accuracy rate calculation unit that calculates, when a determination result obtained by a determination unit of interest among the determination units corresponds to a determination result matched at the certain percentage or more or matches the determination result output by the second output unit, an accuracy rate of the determination unit of interest, regarding that the determination result obtained by the determination unit of interest is correct.

9 Claims, 4 Drawing Sheets

INFORMATION PROCESSING APPARATUS AND NON-TRANSITORY COMPUTER READABLE MEDIUM FOR DETERMINING ACCURACY OF ANALYZED INPUT DATA

CROSS-REFERENCE TO RELATED APPLICATIONS

This application is based on and claims priority under 35 USC 119 from Japanese Patent Application No. 2018-052197 filed Mar. 20, 2018.

BACKGROUND (i) Technical Field

The present invention relates to an information processing apparatus and a non-transitory computer readable medium.

(ii) Related Art

In the case of making determinations on inputs with the use of a determination unit, to obtain the accuracy rate of determinations made by the determination unit, there is one exemplary method of obtaining the proportion of correct determination results to all inputs by determining whether or not each input's determination result obtained by the determination unit is correct using a method with higher determination accuracy (such as checking by a person). However, this determination using such a method with higher determination accuracy costs more than determinations made by the determination unit. Otherwise, it is only necessary to use this method with higher determination accuracy in the first place, instead of using the determination unit. Therefore, it involves a great cost to use this method to determine whether or not all the inputs' determination results are correct.

SUMMARY

According to an aspect of the invention, there is provided an information processing apparatus including multiple determination units, a first output unit, a second output unit, and an accuracy rate calculation unit. The multiple determination units make determinations on an input using different methods, and obtain determination results for the input. The first output unit outputs, when a certain percentage or more of the determination results obtained by the multiple determination units match, a determination result matched at the certain percentage or more. The second output unit outputs, when the first output unit does not find a determination result matched at the certain percentage or more, a final determination result for the input. The accuracy rate calculation unit calculates, when a determination result obtained by a determination unit of interest among the multiple determination units corresponds to a determination result matched at the certain percentage or more that is found by the first output unit, or matches the determination result output by the second output unit, an accuracy rate of the determination unit of interest, regarding that the determination result obtained by the determination unit of interest is correct.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the present invention will be described.

In the exemplary embodiment, an information processing apparatus makes a determination on input data using two different determination units, and, if the determination results obtained by these two determination units match, outputs the determination results as a final determination result of the apparatus. If the determination results obtained by the two determination units do not match, the information processing apparatus makes a determination using a third determination unit different from the two determination units, and outputs a determination result obtained by the third determination unit as a final determination result of the apparatus. The third determination unit is, based on the past statistical information and the like, a determination unit expected to have a higher accuracy rate than the first two determination units.

These three determination units make determinations of the same type on the same input data. There is no particular restriction on the processing details of "determination". For example, processing to recognize the details of input data is one example of "determination". For example, character recognition processing such as optical character recognition (OCR), and image recognition processing are examples of the above. In addition, processing to classify input data into multiple categories is also an example of "determination".

The information processing apparatus has a mechanism (an accuracy rate calculation unit 22 described later) for calculating the accuracy rate of each determination unit or the whole information processing apparatus using determination results obtained for the actual input data group, without using a data set for learning where a correct answer for each item of data is known in advance.

Figure 1:
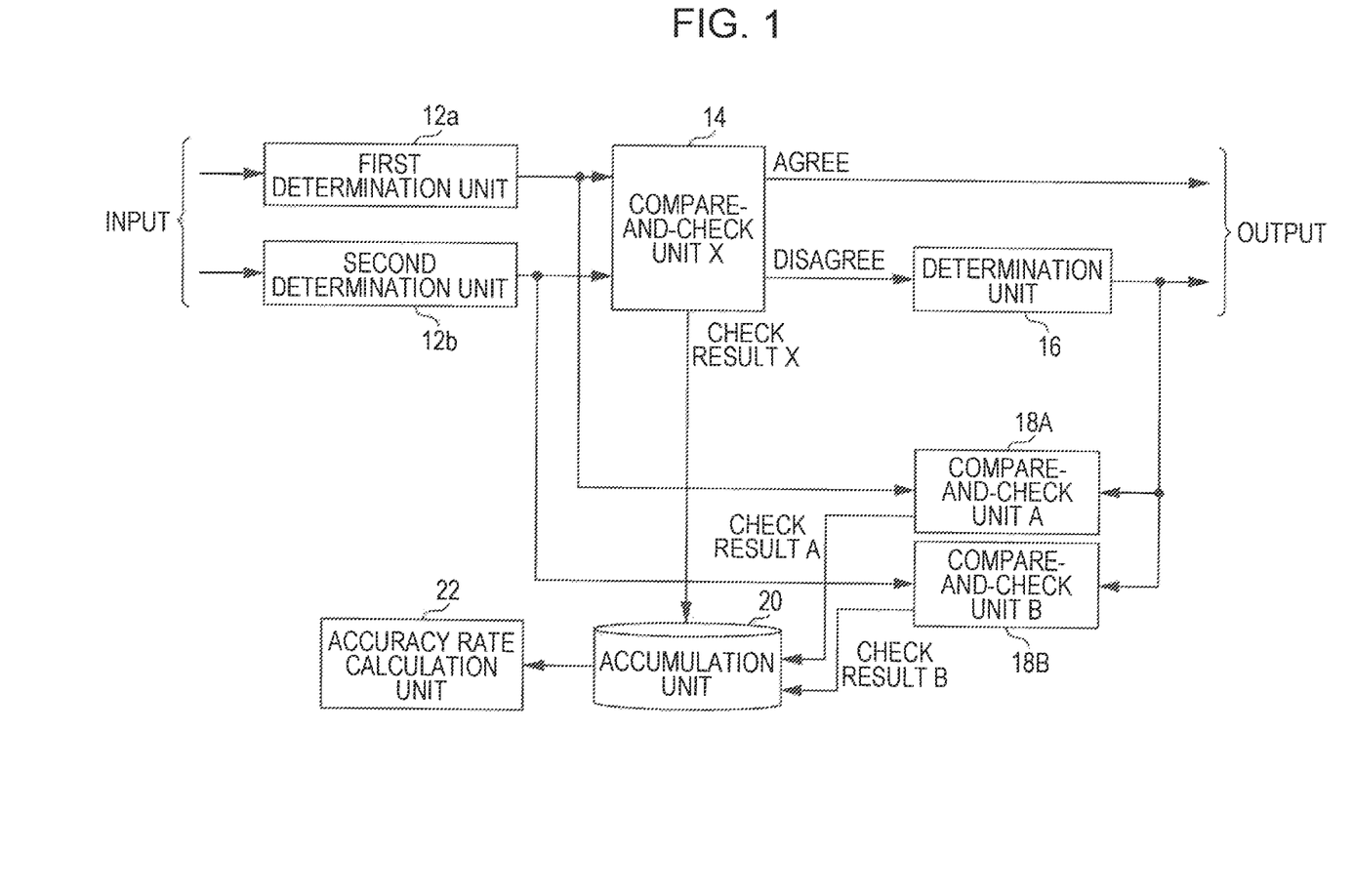
FIG. 1 is a diagram illustrating an exemplary functional configuration of an information processing apparatus according to an exemplary embodiment.

FIG. 1 illustrates an example of the functional configuration of the foregoing information processing apparatus.

A first determination unit 12a makes a determination on input data using a first determination method, and outputs a first determination result. A second determination unit 12b makes a determination on the input data using a second determination method different from the first determination method, and outputs a second determination result. The first determination method and the second determination method may be determination methods of different types, or may be determination methods of the same type having different specific processing details. Note that determination units mentioned in this specification, including the first determination unit 12a and the second determination unit 12b, may include one in which a substantial determination is made by a person.

When "determination" is character recognition, for example, a specific OCR engine may be used as the first determination method; and, as the second determination method, the input data (image data) may be shown to a person to recognize the details of the text. This case is an example of determination methods of different types. Alternatively, for example, a specific first OCR engine may be used as the first determination method, and a second OCR engine using an algorithm different from that of the first OCR engine may be used as the second determination method. This case is an example of determination methods of the same type having different specific processing details. Likewise, two different people may make determinations, which serve as the first and second determination methods. This case is also an example of determination methods of the same type having different specific processing details.

A compare-and-check unit (X) 14 checks (i.e., compares) the first determination result input from the first determination unit 12a against the second determination result input from the second determination unit 12b, and determines whether the two determination results agree (that is, match) or disagree (not match). If the two determination results agree, the compare-and-check unit 14 outputs the determination results in agreement as a final determination result of the information processing apparatus. If the two determination results disagree, the compare-and-check unit 14 causes a determination unit 16 to make a determination on the input data. In addition, the compare-and-check unit 14 accumulates a check result X, which is the result of checking the two determination results against each other (that is, a value indicating whether the two determination results "agree" or "disagree"), in an accumulation unit 20. The value of the check result X is a binary value indicating whether the two determination results agree or disagree. In the following description, for example, for the sake of convenience of calculation, the value of the check result X is "1" when the two determination results agree and is "0" when the two determination results disagree (the same applies to compare-and-check units 18A and 18B described later). The check result X accumulated in the accumulation unit 20 is associated with identification information of the input data (which is a serial number sequentially given to each item of input data). In doing so, which check result corresponds to which input data is identifiable.

On receipt of a trigger from the compare-and-check unit 14 in the case where the two determination results disagree, the determination unit 16 makes a determination on the input data using a third determination method different from either of the first and second determination methods. The third determination method may be a determination method of a type different from either of the first and second determination method. Alternatively, the third determination method may be a determination method of the same type as one or both of the first and second determination methods having different specific processing details. In the case where "determination" is character recognition by way of example, when the first determination method is, for example, one that uses an OCR engine and the second determination method is a determination made by a person, the third determination method may be a determination made by a different person. Alternatively, different OCR engines may be used as the first, second, and third determination methods. In any case, as the third determination method, one expected to statistically have a higher accuracy rate than the first and second determination units is used.

In the case where the result of comparison and checking done by the compare-and-check unit 14 indicates that the two determination results disagree, the determination result obtained by the determination unit 16 using the third determination method is output as the final determination result of the information processing apparatus.

Although the determination unit 16 may always make a determination on the same input data in parallel with the determination units 12a and 12b, the determination unit 16 may make a determination only when the determination result obtained by the compare-and-check unit 14 indicates that the two determination results disagree. Accordingly, the cost of a determination made by the determination unit 16 is reduced.

The first and second determination units 12a and 12b, the compare-and-check unit 14, and the determination unit 16 described above are portions of a determination mechanism for making a determination on input data in the information processing apparatus.

In contrast, the compare-and-check units 18A and 18B, the accumulation unit 20, and the accuracy rate calculation unit 22 described below accumulate many determination results obtained by the above-mentioned determination mechanism, and, on the basis of the accumulated information, obtain the accuracy rate of determinations made by each of the first and second determination units 12a and 12b and the accuracy rate of the determination unit 16. In the case where the determination processing performed by the determination mechanism is character recognition, the accuracy rate is the recognition rate of character recognition.

That is, at first, the compare-and-check unit 18A checks the determination result obtained by the first determination unit 12a against the determination result obtained by the determination unit 16, and accumulates the result of checking (check result A) in association with the identification information i of the input data in the accumulation unit 20. The compare-and-check unit 18B checks the determination result obtained by the second determination unit 12b against the determination result obtained by the determination unit 16, and accumulates the result of checking (check result B) in association with the identification information i of the input data in the accumulation unit 20.

The accumulation unit 20 accumulates, for each item i of input data, three check results $X_i$, $A_i$, and $B_i$ obtained by the compare-and-check units 14, 18A, and 18B.

The accuracy rate calculation unit 22 calculates the accuracy rate of the first determination unit 12a, the second determination unit 12b, and the whole information processing apparatus using the check results $X_i$, $A_i$, and $B_i$ accumulated in the accumulation unit 20.

A method of calculating the accuracy rate, performed by the accuracy rate calculation unit 22, will be described. At first, a method of calculating the accuracy rate α of the first determination unit 12a and the accuracy rate β of the second determination unit 12b will be described.

This calculation method calculates the accuracy rates α and β on the basis of the following three assumptions (a), (b), and (c):
(a) When the check result X obtained by the compare-and-check unit 14 is "agree", the determination results obtained by the first determination unit 12a and the second determination unit 12b are both correct;
(b) When the check result A obtained by the compare-and-check unit 18A is "agree", the determination result obtained by the first determination unit 12a is correct; and
(c) When the check result B obtained by the compare-and-check unit 18B is "agree", the determination result obtained by the second determination unit 12b is correct.

That is, the accuracy rates α and β are obtained assuming that the determination result obtained by the first determination unit 12a is correct when it agrees with the determination result obtained by the second determination unit 12b or the determination unit 16, and that the determination result obtained by the second determination unit 12b is correct when it agrees with the determination result obtained by the first determination unit 12a or the determination unit 16. On the basis of these assumptions, the accuracy rate calculation unit 22 calculates the accuracy rates α and β in accordance with the following equations (1):

$$\left.\begin{array}{l}\alpha = \frac{1}{N}\sum_{i=1}^{N}(X_i \mid A_i) \\ \beta = \frac{1}{N}\sum_{i=1}^{N}(X_i \mid B_i)\end{array}\right\} \quad (1)$$

where i is a serial number which is the identification information of input data, and N is the total number of items of input data. In addition, "P|Q" is an operation that gives 1 when P or Q is 1, and gives 0 when both P and Q are 0.

When the check result obtained by the compare-and-check unit 14 is "agree", the determination unit 16 may not make a determination. In this case, because there is no determination result obtained by the determination unit 16, both the check results obtained by the compare-and-check units 18A and 18B using that determination result may be "0". In such a case, the accuracy rate calculation unit 22 may calculate the accuracy rates using equations (2) below instead of the above-mentioned equations (1):

$$\left.\begin{array}{l}\alpha = \frac{1}{N}\sum_{i=1}^{N}(X_i + A_i) \\ \beta = \frac{1}{N}\sum_{i=1}^{N}(X_i + B_i)\end{array}\right\} \quad (2)$$

Next, a process of obtaining the accuracy rate of the whole determination mechanism (that is, the first and second determination units 12a and 12b, and the determination unit 16) of the information processing apparatus will be described. Here, it is assumed that the determination unit 16 has the same characteristics as one of the first determination unit 12a and the second determination unit 12b. Two determination units that have the same characteristics are statistically assumed to have an equal accuracy rate.

Here, it is assumed that, for example, the determination unit 16 has the same characteristics as the first determination unit 12a. For example, in the case of performing character recognition, it is assumed that the first determination unit 12a and the determination unit 16 present an image of input data to a person and receive an input of text read from that image, and the second determination unit 12b is an OCR engine.

It is assumed that γ is the accuracy rate (that is, the recognition rate) of the whole determination mechanism. It is assumed that the accuracy rates α and β of the first determination unit 12a and the second determination unit 12b have been already calculated by the above-described method. In this example, as has been described above, if the number of items of input data is sufficiently great, it may be regarded that the determination unit 16 has the same accuracy rate α as the first determination unit 12a. Therefore, the accuracy rate calculation unit 22 is able to calculate the accuracy rate γ using the following equation:

$$\gamma = \alpha\beta + (1-\alpha\beta)\alpha \quad (3)$$

More specifically, there are two cases in which the whole determination mechanism is correct: (a) the first determination unit 12a is correct and the second determination unit 12b is correct; and (b) other than the above, and the determination unit 16 is correct. The probability of occurrence of (a) is αβ, and the probability of occurrence of (b) is (1−αβ)α, which is the product of (1−αβ), the probability of being other than (a), and α, the probability of the determination unit 16 being correct. Thus, the sum of the probabilities of (a) and (b) is the final accuracy rate γ.

As has been described above, the information processing apparatus illustrated in FIG. 1 calculates the accuracy rates α and β of the first determination unit 12a and the second determination unit 12b using many accumulated determination results obtained for input data, and, when the first determination unit 12a and the determination unit 16 have the same characteristics, the information processing apparatus calculates the accuracy rate γ of the whole determination mechanism in the information processing apparatus.

Figure 2:
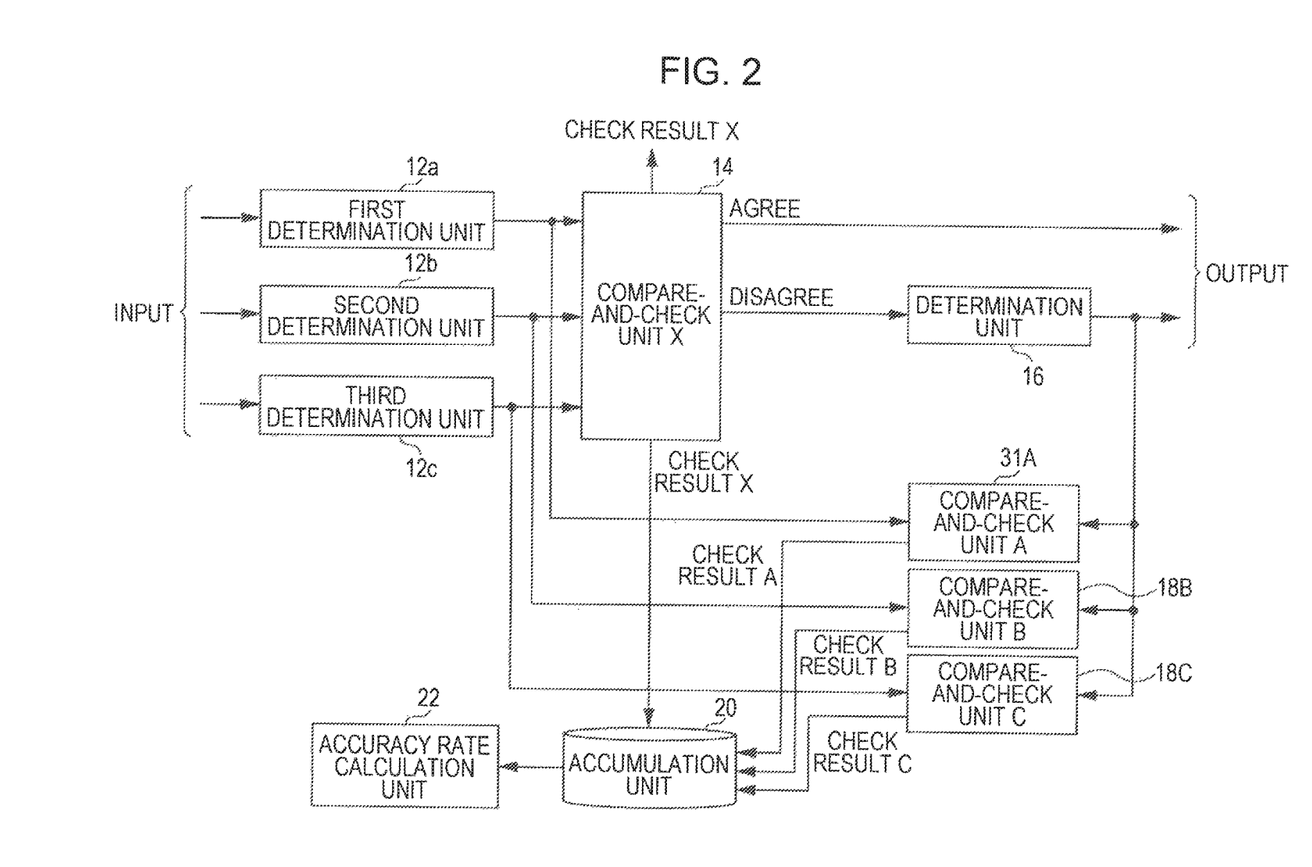
FIG. 2 is a diagram illustrating another exemplary functional configuration of the information processing apparatus according to the exemplary embodiment.

Although the number of determination units at the first stage serving as targets to be compared and checked by the compare-and-check unit 14 is two in the example illustrated in FIG. 1, this is only exemplary, and the number of determination units at the first stage may be three or more. FIG. 2 illustrates an exemplary configuration of the information processing apparatus including the first, second, and third determination units 12a, 12b, and 12c. In the example illustrated in FIG. 2, the compare-and-check unit 14 receives determination results for input data i from the first, second, and third determination units 12a, 12b, and 12c. When these three determination results satisfy a certain (that is, predetermined) agreement condition, the determination results in agreement are output as the final determination result of the information processing apparatus, and a value indicating "agree" is accumulated as a check result $X_i$ in the accumulation unit 20. As the agreement condition, the condition that "all these three determination results match" may be used, or the condition that "among the three determination results, more than half, that is, two or more, determination results match" may be used. When the three determination results do not satisfy the agreement condition, the compare-and-check unit 14 sends a trigger to the determination unit 16, and accumulates a value indicating "disagree" as the check result $X_i$ in the accumulation unit 20. On receipt of the trigger, the determination unit 16 makes a determination on the input data i, and outputs the determination result as the final determination result.

In addition, the information processing apparatus illustrated in FIG. 2 includes a compare-and-check unit 18C, besides the compare-and-check units 18A and 18B. The compare-and-check unit 18C checks the deter ration result obtained by the third determination unit 12c against the determination result obtained by the determination unit 16, and accumulates the result of checking (check result Ci) in the accumulation unit 20.

Also in the example illustrated in FIG. 2, the accuracy rates of the first, second, and third determination units 12a, 12b, and 12c may be obtained using a method that is the same as or similar to that in the example illustrated in FIG. 1.

Figure 3:
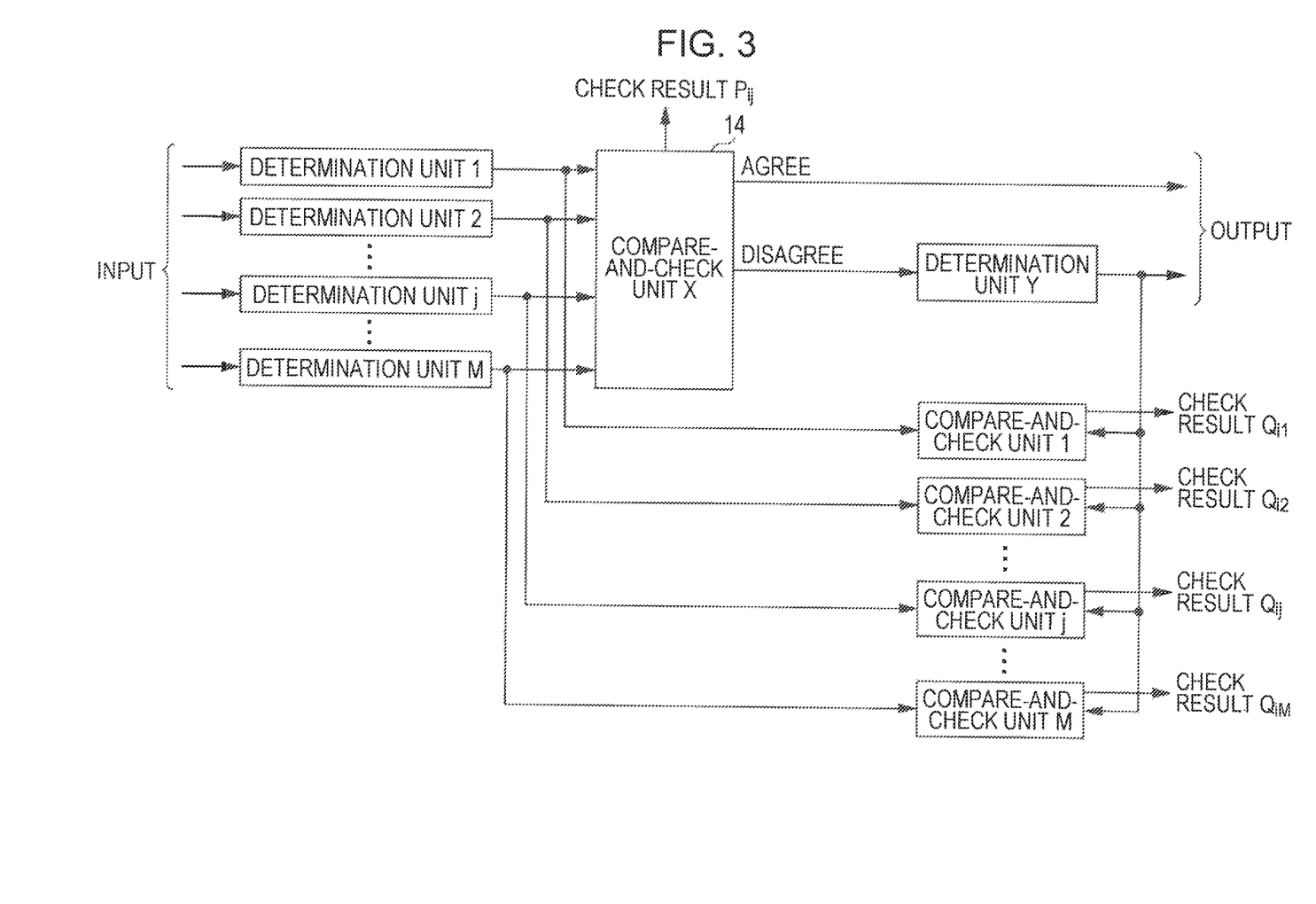
FIG. 3 is a diagram illustrating yet another exemplary functional configuration of the information processing apparatus according to the exemplary embodiment.

FIG. 3 illustrates a generalized configuration of FIGS. 1 and 2. The information processing apparatus illustrated in FIG. 3 has M (M is an integer greater than or equal to 2) determination units at the first stage, which serve as targets to be compared and checked by the compare-and-check unit 14. That is, determination units 1, 2, 3, . . . , j, . . . and M make determinations on input data, and input the determination results to the compare-and-check unit 14. The compare-and-check unit 14 compares the M determination results from the M determination units, and determines whether these determination results satisfy an agreement condition. The agreement condition is that a certain percentage or more of the M determination results match. In the following description, it is assumed that the number of determination results corresponding to the certain proportion with respect to M is Z. Z is an integer greater than or equal to 2 and less than or equal to M. In one example, Z is an integer that is half of M. If determination results that satisfy the agreement condition are found, the compare-and-check unit 14 outputs the determination results as a final determination result of the information processing apparatus. In this case, it is regarded that the final determination result is correct, and the determination result of each determination unit that disagrees with the final determination result is incorrect. In the case of M=2, that is, when the number of determination units 12 is two, the agreement condition that a certain percentage or more of the M determination results match is the condition that the determination results of these two determination units 12 match.

When Z is less than or equal to ½ of M, there may be multiple sets of Z or more matching determination results among the M determination results. In this case, the compare-and-check unit 14 regards, among these sets of Z or more matching determination results, a set of matching determination results whose number is the greatest as the final determination result of the information processing apparatus (that is, correct), and regards the rest as incorrect.

The compare-and-check unit 14 obtains a check result $P_{ij}$ for input data i for each determination unit j, and accumulates the check result $P_{ij}$ in the accumulation unit 20. The check result $P_{ij}$ for the determination unit j is 1 when the determination result for the input data i obtained by the determination unit j is a determination result that satisfies the agreement condition of the compare-and-check unit 14; otherwise, $P_{ij}=0$. That is, when there are no determination result that satisfies the agreement condition or when the determination result obtained by the determination unit j does not match the final (correct) determination result output by the compare-and-check unit 14, then, $P_{ij}=0$.

When no determination result that satisfies the agreement condition is found by the compare-and-check unit 14, a determination unit Y at the second stage makes a determination on the input data i, and this determination result is output as the final determination result of the information processing apparatus.

For input data i, a compare-and-check unit j (j is an integer greater than or equal to 1 and less than or equal to M) generates a check result $Q_{ij}$ indicting whether a determination result obtained by a corresponding determination unit j at the first stage matches a determination result obtained by the determination unit Y at the second stage (the value is 1 when the two determination results match and is 0 when the two determination results do not match), and accumulates the check result $Q_{ij}$ in the accumulation unit 20. When the compare-and-check unit 14 finds a determination result that satisfies the agreement condition, then, $Q_{ij}$ is 0 for all j's.

The accuracy rate calculation unit 22 calculates the accuracy rate Rj of each determination unit j at the first stage using the following equation:

$$R_j = \frac{1}{N} \sum_{i=1}^{N} (P_{ij} | Q_{ij}) \quad (4)$$

Figure 4:
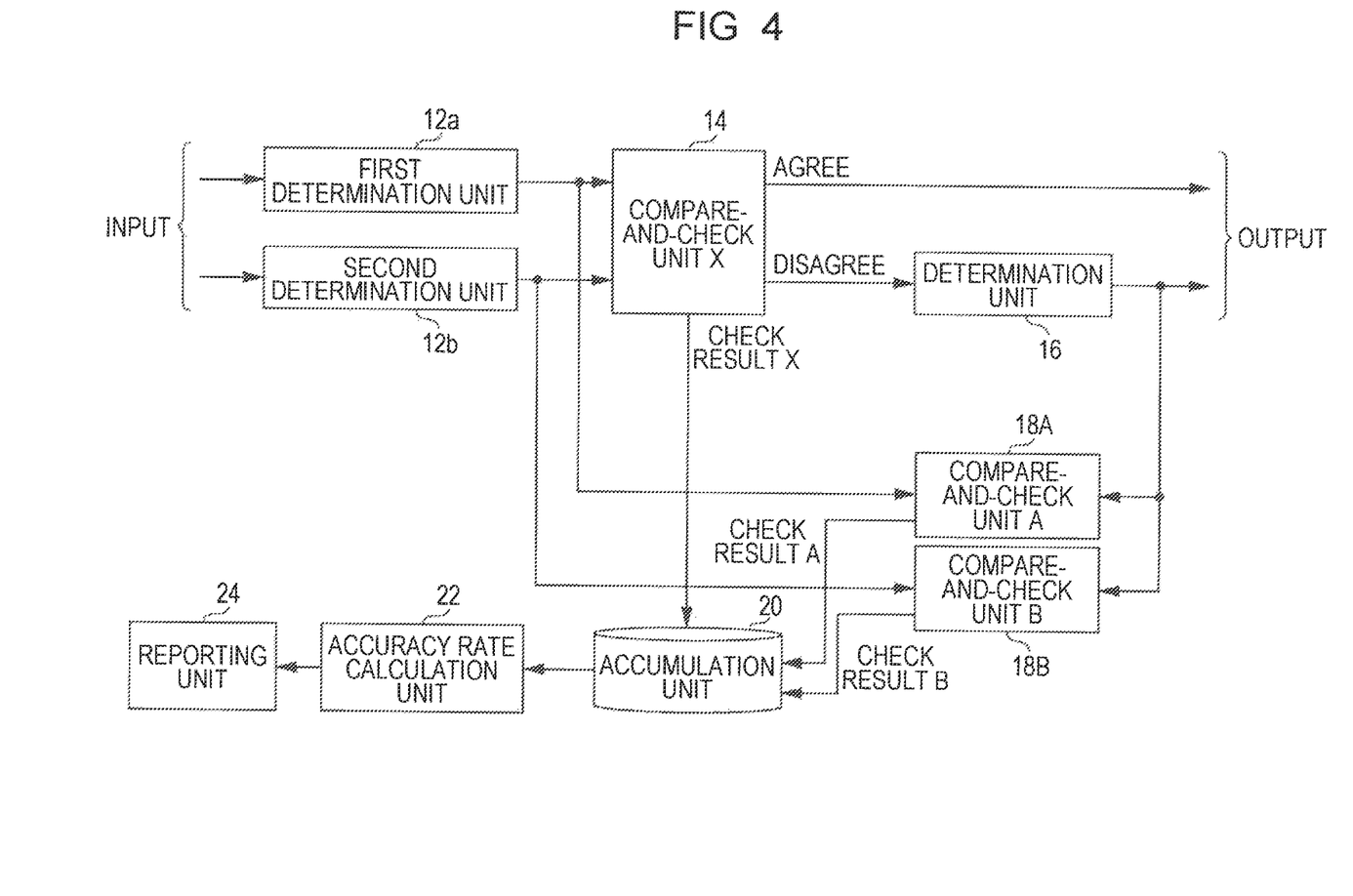
FIG. 4 is a diagram illustrating an exemplary information processing apparatus that further includes a reporting unit.

Next, a modification will be described. An information processing apparatus illustrated in FIG. 4 is the information processing apparatus illustrated in FIG. 1 with the addition of a reporting unit 24. The accuracy rate calculation unit 22 calculates, for each predetermined period, such as one day, one week, or one month, the accuracy rate of the first determination unit 12a, the second determination unit 12b, and the whole information processing apparatus using the check results $X_i$, $A_i$, and $B_i$ accumulated in the accumulation unit 20 by the compare-and-check units 14, 18A, and 18B in accordance with determinations made within the predetermined period, and notifies the reporting unit 24 of the calculated accuracy rates. The reporting unit 24 notifies the user of the information processing apparatus of information indicating the reported accuracy rates using a method such as screen display, print output, or email to a pre-registered administrator. The reporting unit 24 also has a threshold for determining whether it is necessary to give a warning about each of the accuracy rates of the first determination unit 12a, the second determination unit 12b, and the whole information processing apparatus. The reporting unit 24 compares each of the accuracy rates reported from the accuracy rate calculation unit 22 with a corresponding threshold. Among the accuracy rates of the first determination unit 12a, the second determination unit 12b, and the whole information processing apparatus, if there is an accuracy rate that falls below a corresponding threshold, the reporting unit 24 notifies the user of the information processing apparatus of warning information indicating this using a method such as screen display, print output, or email to a pre-registered administrator.

Accordingly, in the case where an OCR engine is used for any of the determination units (the first determination unit 12a, the second determination unit 12b, the third determination unit 12c, and so forth) at the first stage, the user is notified that the accuracy rate of the OCR engine has fallen below the threshold. The user takes actions such as changing parameters of the OCR processing, having the OCR engine do additional learning, or changing the form design. In addition, the user may recognize that there has been an influence of, for example, a change of a person who fills in the form serving as a target of character recognition by the OCR.

The above-described information processing apparatus may be configured as a hardware logic circuit in one example. In another example, the information processing apparatus may be realized by, for example, causing a built-in computer to execute a program representing the function of each functional module in a system or an apparatus. Here, the computer has a circuit configuration in which, for example, as hardware, a processor such as a central processing unit (CPU), memory such as random-access memory (RAM) and read-only memory (ROM) (primary storage), a hard disk drive (HDD) controller that controls an HDD, various input/output (I/O) interfaces, and a network interface for controlling connection with a network such as a local area network (LAN) are connected to one another via bus. In addition, for example, a disk drive for reading and/or writing data from/to portable disc recording media such as a compact disc (CD) and a digital versatile disc (DVD), and a memory reader/writer for reading and/or writing data from/to portable non-volatile recording media of various standards, such as flash memory, may be connected via an I/O interface to the bus. A program describing the processing details of each of the above-described functional modules is saved in a fixed storage device such as an HDD via a recording medium such as a CD or a DVD or via communication means such as a network, and is installed in a computer. The program stored in the fixed storage device as read into RAM and is executed by a processor such as a CPU, thereby realizing a group of the above-described functional modules. In addition, the information processing apparatus may be configured by a combination of software and hardware.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a computer programmed to execute:
        a plurality of determination units that make determinations on an input using different methods, and obtain determination results for the input, the plurality of determination units including a first determination unit that obtains a first determination result and a second determination unit that obtains a second determination result;
        a first output unit that compares the first determination result from the first determination unit against the second determination result from the second determination unit, and determines whether the first determination result and the second determination result match, and outputs, when a certain percentage or more of the first determination result and the second determination result match, a determination result matched at the certain percentage or more;
        a second output unit that outputs, when the first output unit does not find a determination result matched at the certain percentage or more, a final determination result for the input; and
        an accuracy rate calculation unit that calculates an accuracy rate of a determination unit of interest when a determination result obtained by the determination unit of interest among the plurality of determination units matches to a determination result matched at the certain percentage or more that is found by the first output unit, or matches the final determination result output by the second output unit.

2. The information processing apparatus according to claim 1, wherein:
    the accuracy rate calculation unit calculates an accuracy rate of the first determination unit and an accuracy rate of the second determination unit, when the first determination unit and the second determination unit each are the determination unit of interest.

3. The information processing apparatus according to claim 2, wherein the computer is further programmed to execute:
    a calculation unit that calculates an accuracy rate of a system including the first output unit and the second output unit using the accuracy rate of the first determination unit and the accuracy rate of the second determination unit, when the first determination unit and a unit that makes the determination in the second output unit have same characteristics, the accuracy rate of the first determination unit and an accuracy rate of the second output unit are an identical value.

4. The information processing apparatus according to claim 3, wherein the computer is further programmed to execute:
    a warning unit that gives a warning when the accuracy rate of the determination unit of interest falls below a threshold set in advance for the determination unit of interest.

5. The information processing apparatus according to claim 2, wherein the computer is further programmed to execute:
    a warning unit that gives a warning when the accuracy rate of the determination unit of interest falls below a threshold set in advance for the determination unit of interest.

6. The information processing apparatus according to claim 1, wherein the computer is further programmed to execute:
    a warning unit that gives a warning when the accuracy rate of the determination unit of interest falls below a threshold set in advance for the determination unit of interest.

7. The information processing apparatus according to claim 1, wherein, instead of the computer being programmed to execute, for each of the plurality of determination units, making determinations on an input using different methods, a user performs functions of at least one of the a plurality of determination units by making a determination on the input.

8. A non-transitory computer readable medium storing a program causing a computer to execute a process, the process comprising:
    making a plurality of determinations on an input using different methods, and obtaining determination results for the input, the determination results including a first determination result and a second determination result;
    comparing the first determination result against the second determination result, and determining whether the first determination result and the second determination result match, and outputting, when a certain percentage or more of first determination result and the second determination result match, a determination result matched at the certain percentage or more;
    outputting, when a determination result matched at the certain percentage or more is not found, a final determination result for the input; and
    calculates an accuracy rate of a method of interest when a determination result obtained by using the method of interest among the different methods matches a determination result matched at the certain percentage or more that is found, or matches the final determination result.

9. An information processing apparatus comprising:
    a plurality of determination means for making determinations on an input using different methods, and obtain determination results for the input, the plurality of determination means including a first determination means that obtains a first determination result and a second determination means that obtains a second determination result;
    first output means for comparing the first determination result from the first determination means against the second determination result from the second determination means, and determines whether the first determination result and the second determination result match, and outputting, when a certain percentage or more of the first determination result and the second determination result match, a determination result matched at the certain percentage or more;

second output means for outputting, when the first output means does not find a determination result matched at the certain percentage or more, a final determination result for the input; and accuracy rate calculation means for calculating an accuracy rate of a determination means of interest when a determination result obtained by the determination means of interest among the plurality of determination means matches a determination result matched at the certain percentage or more that is found by the first output means, or matches the final determination result output by the second output means.

\* \* \* \* \*